US010847976B1

(12) United States Patent
Das et al.

(10) Patent No.: US 10,847,976 B1
(45) Date of Patent: Nov. 24, 2020

(54) SOLAR AUGMENTER

(71) Applicant: Magnolia Optical Technologies, Inc., Woburn, MA (US)

(72) Inventors: Palash Das, West Bengal (IN); Dhrubes Biswas, Burlington, MA (US)

(73) Assignee: Magnolia Optical Technologies, Inc., Woburn, MA (US)

( * ) Notice: Subject to any disclaimer, the term of this patent is extended or adjusted under 35 U.S.C. 154(b) by 0 days.

(21) Appl. No.: 16/127,100

(22) Filed: Sep. 10, 2018

Related U.S. Application Data

(60) Provisional application No. 62/556,019, filed on Sep. 8, 2017.

(51) Int. Cl.
*H02J 3/38* (2006.01)
*H02S 40/30* (2014.01)
*H01H 3/32* (2006.01)
*H01H 1/06* (2006.01)

(52) U.S. Cl.
CPC .............. *H02J 3/385* (2013.01); *H01H 1/06* (2013.01); *H01H 3/32* (2013.01); *H02S 40/30* (2014.12)

(58) Field of Classification Search
CPC ............ H02J 3/385; H02S 40/30; H01H 1/06; H01H 3/32
See application file for complete search history.

(56) References Cited

U.S. PATENT DOCUMENTS

| 8,115,340 | B2 * | 2/2012 | Takehara | H02J 3/383 307/71 |
| 2007/0252716 | A1 * | 11/2007 | Burger | H02M 7/493 340/635 |
| 2014/0231230 | A1 * | 8/2014 | Sarrus | H01H 1/365 200/2 |

* cited by examiner

*Primary Examiner* — Carlos Amaya
(74) *Attorney, Agent, or Firm* — Loginov & Associates, PLLC; William A. Loginov

(57) ABSTRACT

This invention presents an electronically configurable architecture where the plurality of photovoltaic panels can be connected to deliver the maximum power output. This architecture provides maximum power point to the maximum number of photovoltaic panels by connecting them in parallel. Under-rated panels are dynamically coupled with over-rated or maximum-rated panels in a series-connected architecture to utilize the under rated power in the final delivery. Notable efficiency improvements may be observed in contrast to the prevailing optimization with minimum power drop out architecture. The architectural modifications are proposed with bi-stable electromagnetic changeover contacts to minimize the power dissipation in control side. Moreover the rearrangement in connection architecture is proposed to be communicated on instance and regular basis through SMS and SPI protocol for easy fault diagnosis by the service personnel from the proposed data mining firmware.

3 Claims, 8 Drawing Sheets

SOLAR AUGMENTER

RELATED APPLICATIONS

This application claims the benefit of U.S. Provisional Application Ser. No. 62/556,019, entitled SOLAR AUGMENTER, filed Sep. 8, 2017, the teachings of which are expressly incorporated herein by reference.

FIELD OF THE INVENTION

The present application relates to augment the solar powered energy generated from an array of solar panels to perform the maximum beneficial deliverables.

BACKGROUND OF THE INVENTION

At present, solar cells are the most important candidate for renewable energy sources which converts solar irradiation into electrical energy. At its most fundamental level, a solar cell is a PN junction fabricated by diffusing N type dopants into P type silicon substrate. The photo generated carriers in the depletion region of PN junction are separated to create open circuit voltage at the junction and supports current flow when the end terminals are connected through electrical means.

Plurality of solar cells connected in series-parallel combinations to deliver power to the load is termed as solar panel. Plurality of solar panels is connected to supply the necessary power to household or industrial applications as shown in FIG. 1. The solar panels are generally connected to local Maximum Power Point Tracker (MPPT) (10) to confirm the maximum power delivery from each solar panel. Those are connected in parallel. The parallel solar panel combination is connected to MPPT (20) for further maximum power delivery. Moreover the regulator (30) confirms regulated DC voltage supply to the inverter (40) which converts DC to AC power supply to the load.

One of the most important aspects to utilize the solar panels effectively is that the solar panels are to be operated in their maximum power point (MPP) to deliver maximum available power in the load. The characteristics curve of PN junction solar cell intercepts the IV characteristics of the solar cell for a particular level of solar irradiation at a point where MPP voltage and MPP current is achieved; that point is called the maximum power point. This point can be dynamic depending on the nature of the solar cell and the solar irradiation on the solar panel. The optimization of such solar power is regularly done by maximum power point tracker (MPPT) implemented using several algorithms like Perturb and Observe, Incremental Conductance, Current Sweep, Constant Voltage etc.

The management of all solar panels in their above-mentioned MPP is quite challenging when they are connected to deliver necessary power to the load. The maximum power point tracking is important periodically because of the periodic changes in solar irradiation on the panels. Moreover the unexpected dynamic situations like mudding, shading etc. on the solar panels may eventually create the necessity of dynamic MPPT or rearrangement of connection architecture. In case of parallel connection and minimum performance dropout architecture through bypass diode, the available power non utilization problems may occur which eventually may lead to the conceptions of different connection architectures to augment the solar panels with their altogether best performances.

SUMMARY OF THE INVENTION

This invention aims to the advantages of using the combination of series and parallel interconnections of photovoltaic arrays. It caters the need of simultaneous operation of maximum numbers of photovoltaic panels in their maximum power point as well as utilizing the under-performing photovoltaic panels by connecting them with highest performing photovoltaic panels in a different architecture.

In an illustrative embodiment, the solar augmenter includes discrete photovoltaic panels, bi-stable electromechanical relays and embedded control electronics. The embedded electronics in the present application regularly monitors the maximum power point of individual photovoltaic panels. The purpose of such monitoring is intended to specify the average or standard rated, over performing and underperforming photovoltaic panels. The underperformance may be caused due to shading, mudding or manufacturer incompatibilities etc. Initially a standard parallel architecture of photovoltaic panels is implemented. The notification of underperformance instantly triggers the embedded control electronics to modify the connection architecture.

In an illustrative embodiment, this invention aims to dynamically configurable connection architecture of photovoltaic panel interconnection.

One aspect of the disclosure provides for utilization of individual photovoltaic panels to extract maximum performance by: a) Initially connecting all photovoltaic panels in parallel configuration; b) Setting up all photovoltaic panels in maximum power point; c) Monitoring and tracking the performance of individual photovoltaic panels regularly; d) Tracking the below threshold underperforming photovoltaic panel; e) Tracking the above threshold over performing photovoltaic panel; f) Dynamically reconfigure the connection architecture to achieve maximum overall performance.

Another aspect of the disclosure provides dynamic connection reconfiguration of the architecture as above, further including coupling the underperforming panel and over performing panel in series connection to utilize the overall output from all panels in a) Series connection in a preconfigured parallel architecture is done through multiple available series power bus; b) Series power buses are linked with all individual panels through bi-stable switches; c) Parallel power buses are linked with all individual panels through bi-stable switches as well; d) Utilization of those power buses as per requirement through bi-stable switches Another aspect of the disclosure provides installation of plurality of local maximum power point tracker and a global decision making embedded electronics to perform the operations described above, including a) Training of the local MPPT creates new lookup table data for individual photovoltaic panel; b) The local MPPT sets up the individual photovoltaic panel quickly through the lookup table data and genetic algorithm as stated above (b) c) III-Nitride based electronic driven load changer forces the solar panel in its MPP voltage and current; d) Plurality of local MPPT data is accessed by a global embedded system to decide the panel performance and re-connectivity as stated above.

Another aspect of the disclosure provides usage of bi-stable electromechanical relays to minimize power utilization in control electronics and electrical to be used as stated above, including, utilization of double electromagnet to make bi-stable operations of the switch, utilization of spring based diaphragm arrangement for bi-stable operations of the switch, utilization of potential free contact arrangement to confirm the switching actions.

Another aspect of the disclosure provides alarming conditions for updating the end user about reconfiguration, including SMS update of the individual end user to achieve quick response, and no need to check again and again in computer by the end user about the faults.

Another aspect of the disclosure provides an analyzing firmware for data mining for the benefit of system services informing the repetitive/non-repetitive faults, including the global embedded processor as stated above provides the reconfiguration data to the server through SPI bus, and the data mining firmware in the server collects data and rearranges for the fault analysis, and the data mining firmware in the server groups the repetitive faults over time. The service personnel can check and correlate about the repetitive faults quickly to take actions

DETAILED DESCRIPTION

Figure 1:
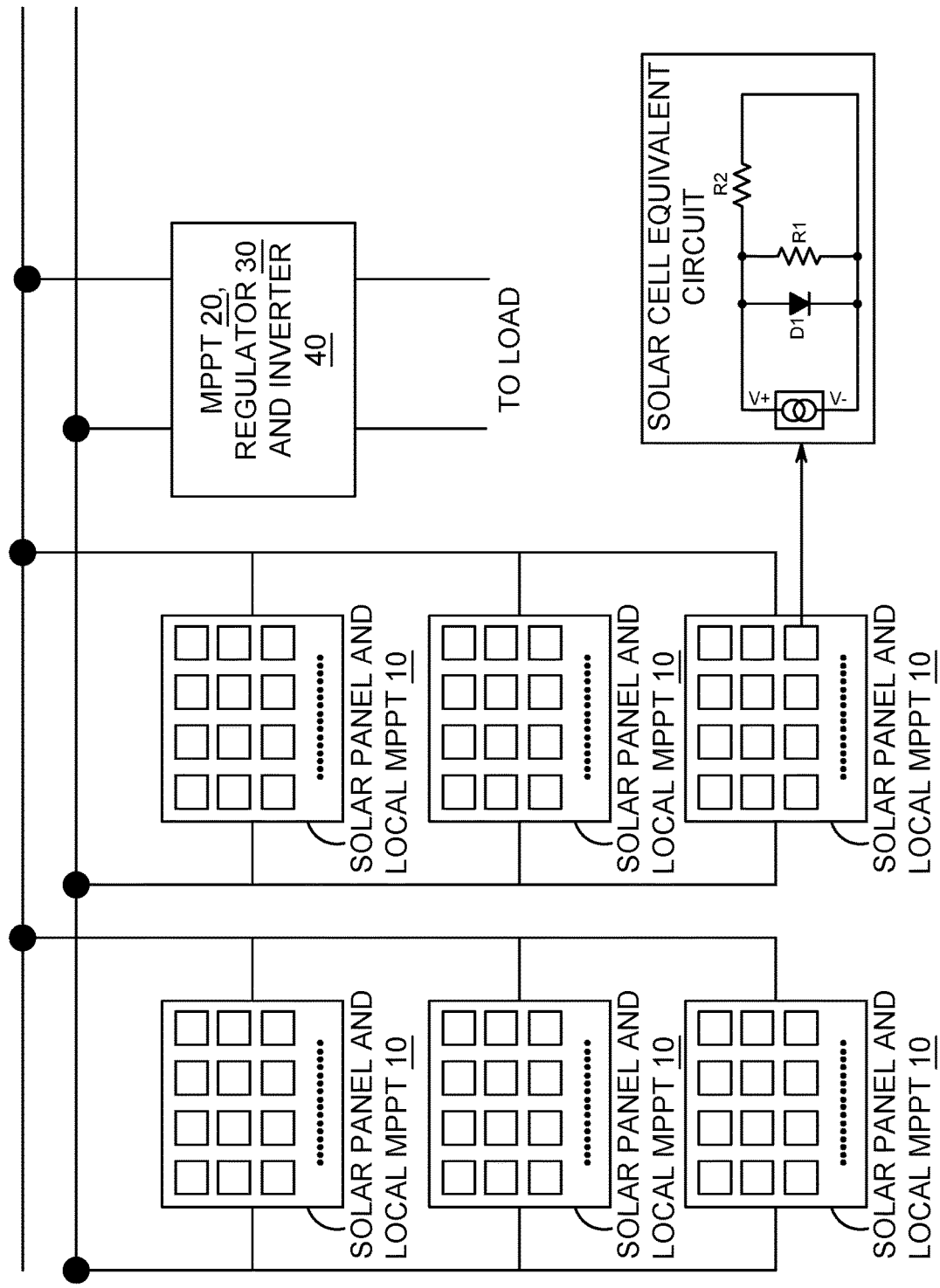
FIG. 1 depicts the prior art of solar panel parallel connection.
Figure 2:
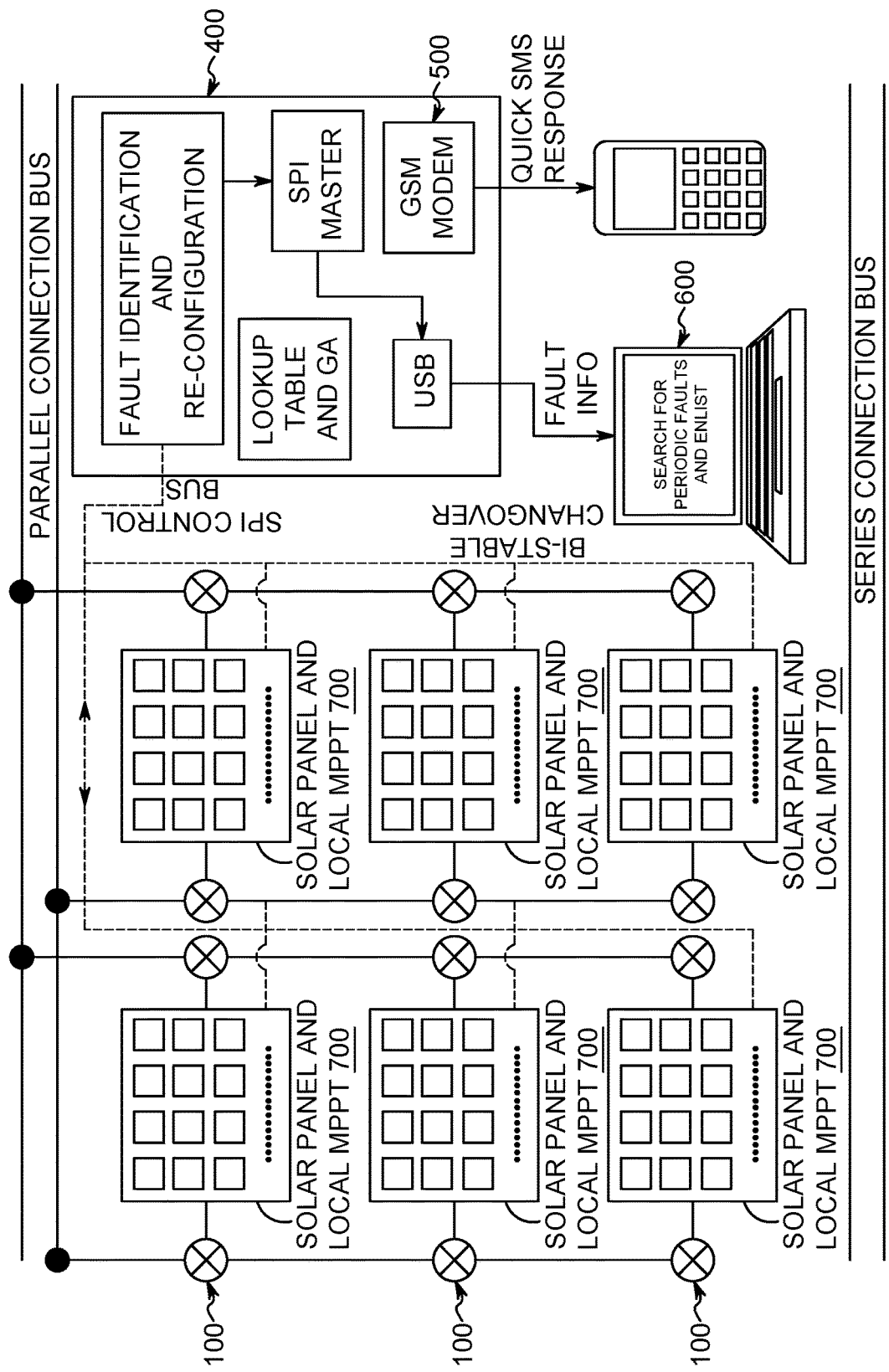
FIG. 2 depicts an exemplary solar panel connection according to aspects of the present disclosure.
Figure 3:
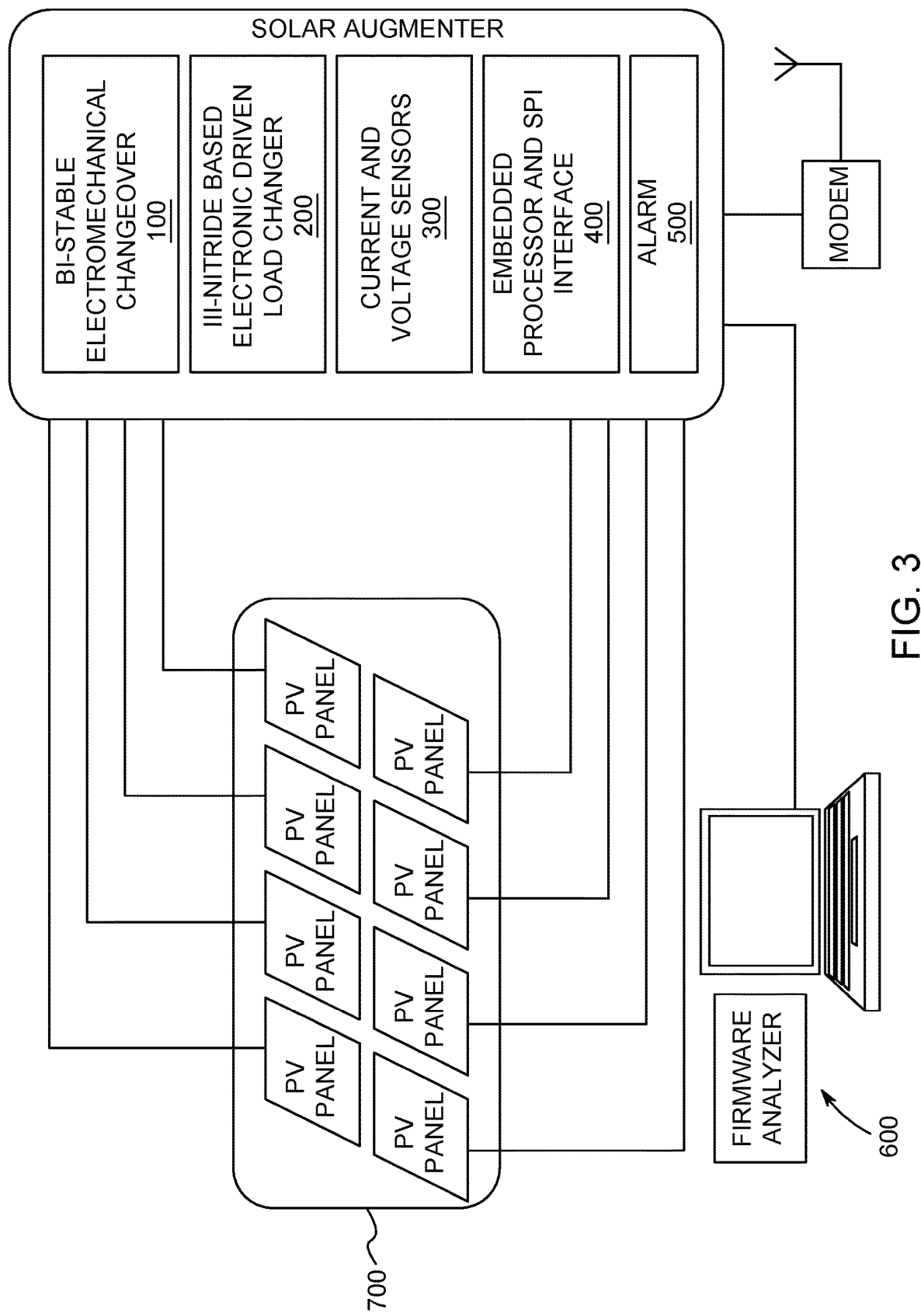
FIG. 3 depicts an overview of the system components according to aspects of the present disclosure.

An illustrative solar augmenter is shown in FIG. 2 and FIG. 3. It is connected to a plurality of photovoltaic panels (700). The augmenter includes bi-stable electromechanical changeover switches (100), electronically driven load changer arrangements (200), current and voltage sensors (300), embedded processing unit along with serial peripheral interfacing bus (400), alarm generator and communicator (500), and a firmware analyzer (600).

Figure 4:
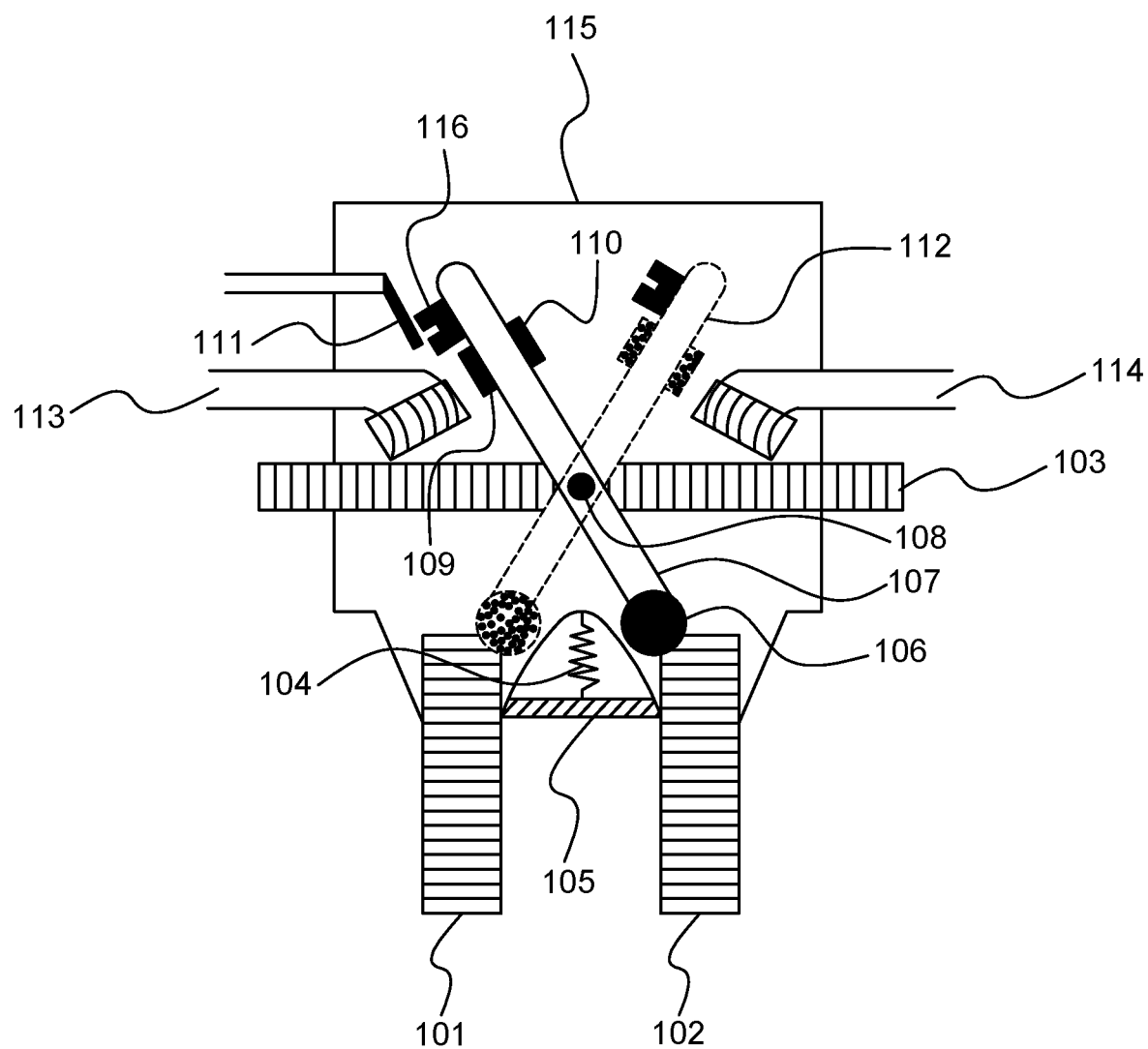
FIG. 4 depicts the internal electromechanical arrangements of the bi-stable electromechanical changeover relay component used according to aspects of the present disclosure.

The bi-stable electromechanical switch (100) arrangement has been done in accordance with the automatic dynamic architectural modification/arrangement of PV panel interconnects. The arrangement of the internals of switch has been shown in FIG. 4. This arrangement allows the changeover contact formation among 101, 102 and 103. The arrangement is made bi-stable with mechanical arrangement; hence no continuous power supply is required to maintain the connectivity. Recent developments of low power DC electromagnetic coil based contactors require continuous 3 W (approximate) power supply to hold the primary contacts, whereas the proposed bi-stable electromechanical switch (100) require around 5 W DC power for around 10 ms to mechanically latch the power connectors. Power consumption for continuous supply to such DC electromagnetic coil is 26.28 KWH for one year of operation. In contrast, the proposed bi-stable electromechanical switch may consume $3.65 \times 10^{-5}$ KWH for one year considering at most 10 changeover operations per day. Hence power requirement for switching actions is made very low (~0.0001% of the prevailing similar kind of switching).

The switch 100 contains a hinge point (108), a contact rod (107) along with a roller (106) arrangement to mechanically roll over the spring based diaphragm (104) arrangement placed on a fixed base (105). This roller and rod arrangement can be electrically connected with 101 and 102 contact points. Thus the changeover contact is made possible among 101, 102 and 103. The roller and rod arrangement is adjoined with 109 and 110 magnets with different poles. The movement of this roller and rod is made possible with 113 and 114 electromagnets by magnetic repulsions. An alternative position of the roller and rod arrangement due to such magnetic repulsion is shown as dotted lines (112) in the figures. It is only required to have the electrical signal for one instant to change the position of the changeover contact; then it is mechanically latched to the either sides. So, the switch may be used for ultra-low power consumptions (as described in above) in electrical switching applications for the proposed Augmenter. Additionally, a low power potential free contact (combination of 111 and 116) has been provided on the roller and rod arrangement for confirming the control circuit about the changeover events. The complete switch arrangement is housed within magnetic shielded container (115).

Figure 5:
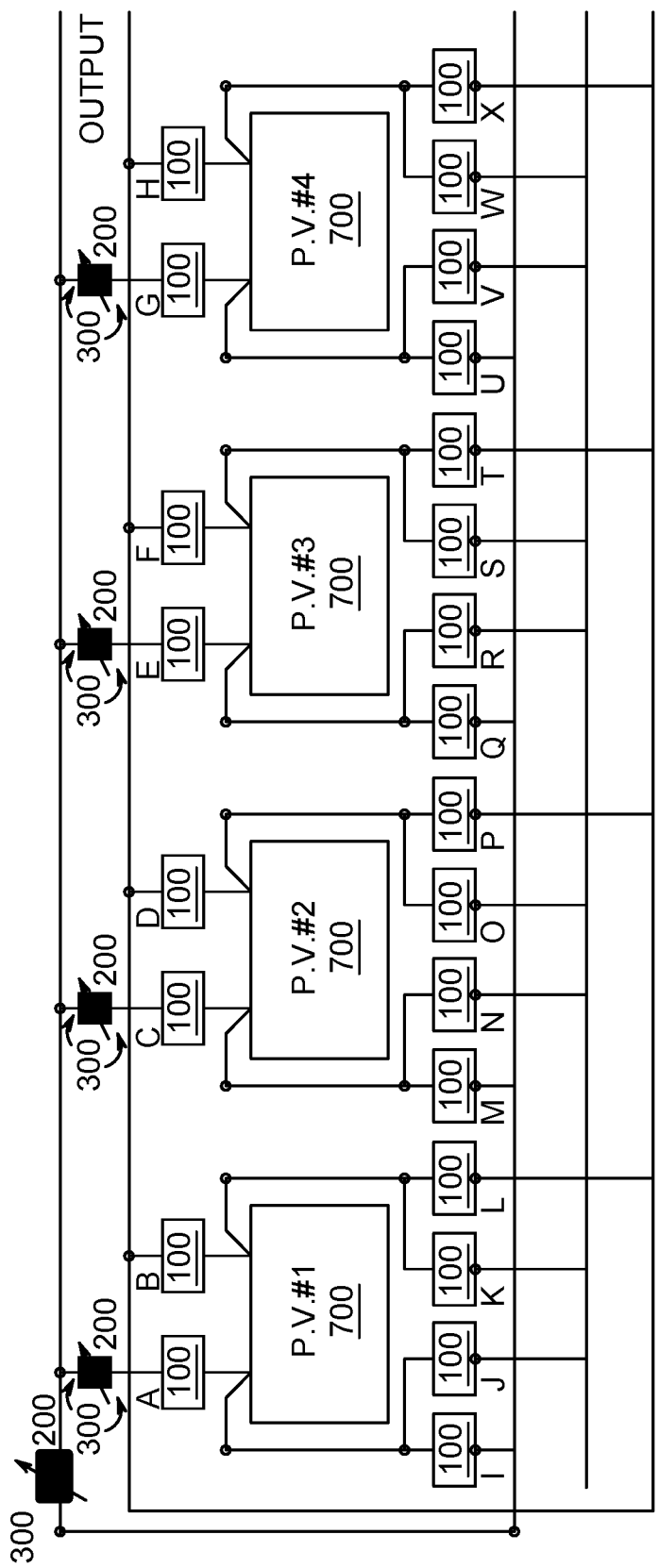
FIG. 5 depicts the complete connection diagram for plurality of photovoltaic panels according to aspects of the present disclosure.

As described above, the bi-stable electromechanical changeover switch (100) is used in the complete connection architecture of photovoltaic panels which is shown in FIG. 5. This architecture has been designed with four photovoltaic panels for illustration; however, the number of panels is not limited to the illustrated figure. It includes photovoltaic panels, bi-stable electromechanical changeover relays (100), electronically driven load changer arrangements (200), current and voltage sensors (300), parallel and series connection buses and the interconnections.

Initially the panels are connected in parallel with the help of illustrated (100) switches named A, B, C, D, E, F, G and H. The voltage and current may be monitored using the current and voltage sensors (300) regularly. Depending on the current-voltage information, the III-Nitride based electronic driven load changer arrangement (200) can be varied electrically through the embedded control circuit. This makes the individual panels in their maximum power point operations through training based lookup table utilization.

The individual panel health (highest/high/regular/low) is regularly monitored by the embedded processing unit along with serial peripheral interfacing bus (400). The dynamic switching situation may occur when one or more than one panel is forced to be operated in lower performance point (not in maximum power point) due to any unexpected reason.

For illustrations, we may assume that P.V. #2 is operating at low performance for some instance and P.V. #4 is continuously operating at highest performance. In this situation, the following series of actions [(i) to (iv)] are taken place by the embedded processing unit based on a connection look up table.

(i) C and D switch are made OFF.
(ii) G and H switch are made OFF.
(iii) M and O switch are made ON.
(iv) V and X switch are made ON.

With the above sequences, the P.V. #2 and P.V. #4 are serially connected to the parallel bus through the serial bus below in FIG. 5.

This dynamic architectural change will compensate the lower performance of P.V. #2 with the adjunct performance of P.V. #4.

Figure 6:
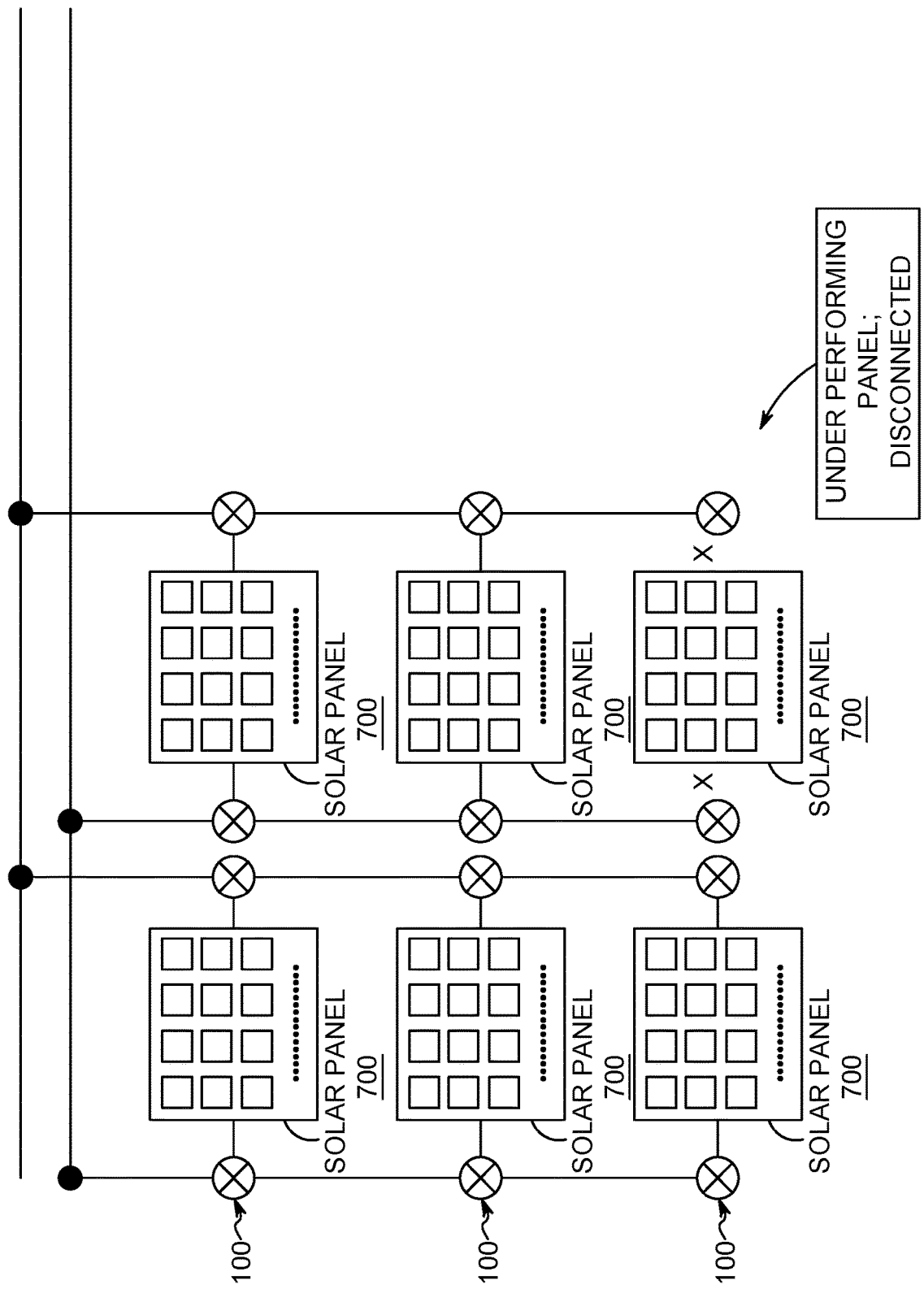
FIG. 6 depicts the connection diagram considering one underperforming solar cell disconnected according to aspects of the present disclosure.
Figure 7:
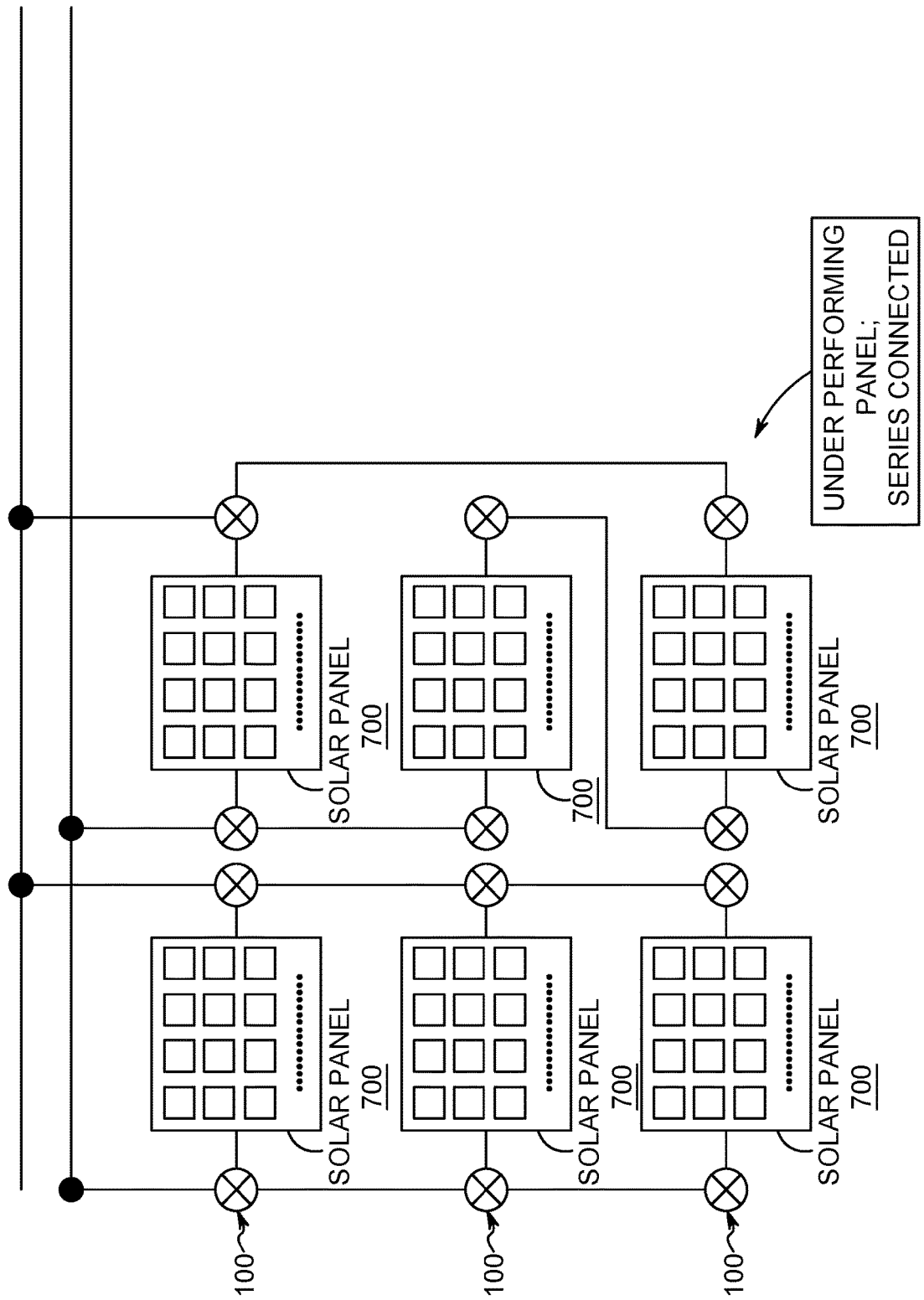
FIG. 7 depicts the connection diagram considering one underperforming solar cell connected in series with a over performing solar panel according to aspects of the present disclosure.

The illustration described above can show the dynamic behavior of the architecture for the sake of maximum utilization of all the photovoltaic panels. It can be shown from the interconnection of solar cell equivalent model (FIG. 6 to FIG. 7) that the proposed innovation of dynamic series-parallel combination may lead to better efficiency than the prevailing method of bypassing the non-performing panel.

Figure 8:
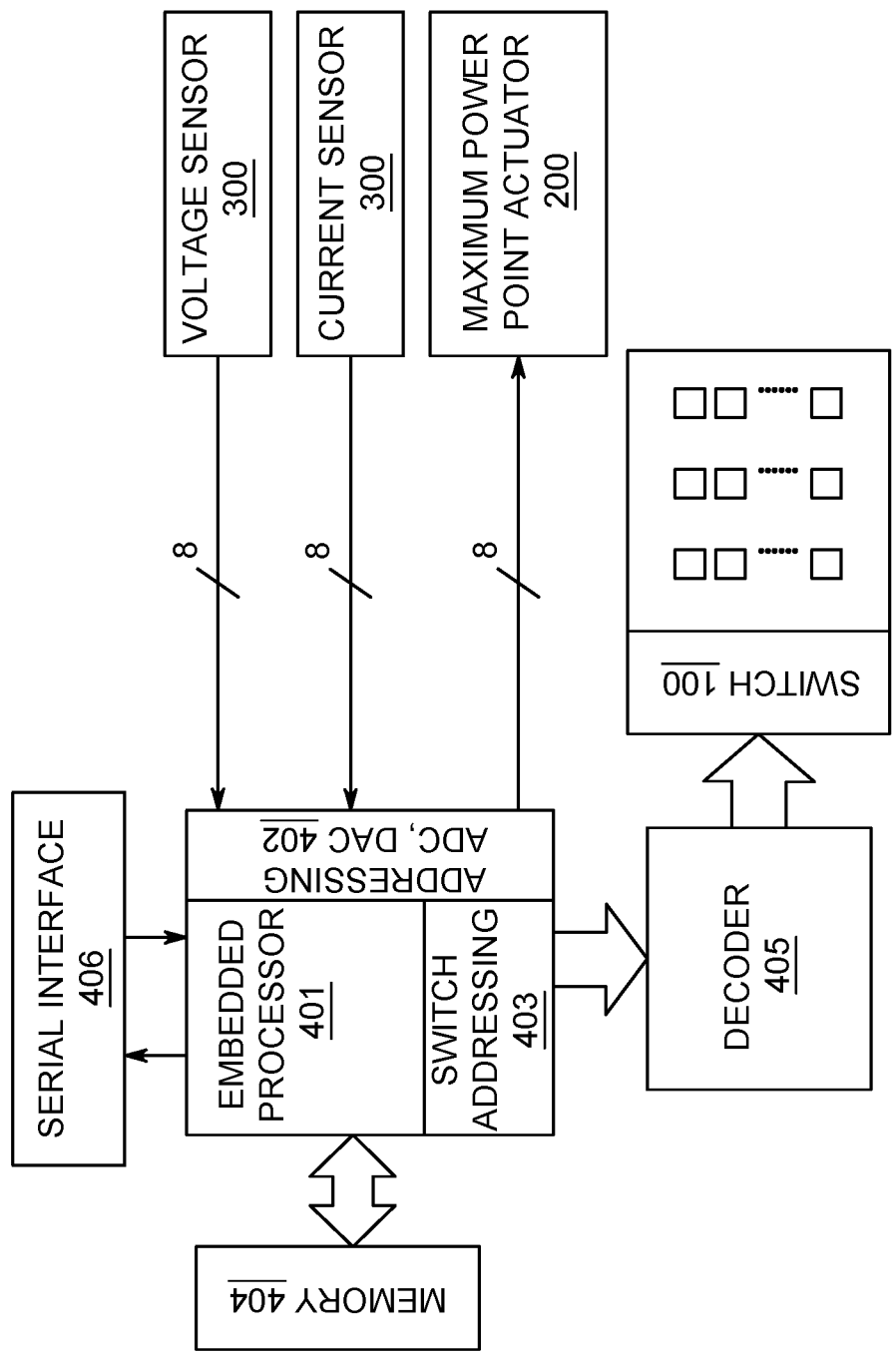
FIG. 8 depicts an overview of the embedded processing unit according to aspects of the present disclosure.

FIG. 8 shows the embedded processing unit which handles sensing, actuating and communication related activities. It includes embedded processor (401), ADC and DAC addressing (402), switch addressing (403), memory (404) and decoder (405) unit. The embedded processor (401) continuously monitors the status of individual solar panels through the sensors, stores the unexpected error log files in memory (405), activates the switches (100). ADC and DAC addressing (402) component is used to addresses the appropriate sensor to receive data and it is also used to address and send actuation signal to the III-Nitride based electronic driven load changer arrangement (200) connected to the solar panels. Individual switch (100) addressing is done through the component 403 which is further fed to the 405 decoder which is used to large number of switch address mapping by the processor. 404 memory component is used to store the log files for unexpected events as well as all kind of lookup tables. The serial interface component 406 is used to connect the global server and local MODEM for fault monitoring applications.

The voltage and current values are regularly sensed by the array of sensors and the same are received by the embedded processor with appropriate sensor addresses for plurality of sensing devices in plurality of photovoltaic panels. An initial series loading effect is introduced by the processor to measure the power point. The initial value of current and voltage is given as a feedback to the processor, after which the processor does an iterative process of loading to track the maximum power point. Once the maximum power point is found, the processor performs the maximum power point finding for the next photovoltaic panel. The analog to digital converter (ADC) and digital to analog converter (DAC) with appropriate addressing scheme is used to perform the operations. The maximum power point data for individual panels are stored in memory (404) as a lookup table for future references. The processor sends parallel connection data packet to the 405 decoder to react the 100 switches.

The regular monitoring of voltage and current and matching them with the previously stored lookup table enables the processing unit to decide about the performance of individual panels. In case of fault detections, the processing unit sends switch reconfiguration packet to the 405 decoder to switch ON or OFF as per modified architecture as described in above.

The reconfigured architecture is checked with the corresponding power output and in case of non-performance, 401 simply isolates the non-performing panel through 100 switches.

Most importantly it is checked with the help of individual 116 potential free contacts whether the connection is originally made. This provides electrical safety to the dynamic architecture.

Once the reconfiguration is completed the data is saved in 404 memory as well as the information is communicated to the local server through SPI bus. The local server tracks the reconfiguration and checks whether the fault event is repetitive over time. This data mining allows the service personnel a better fault finding approach.

The information about architecture reconfiguration is sent through SMS to the administrator as well for fast responses.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, also as used herein, various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances (e.g. 1-2%) of the system. Note also, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Accordingly, this description is meant to be taken only by way of example, and not to otherwise limit the scope of this invention.

What is claimed is:

1. A solar augmenter, comprising:
    at least one bi-stable electromechanical changeover switch, wherein the switch comprises a hinge point, a contact rod, and a roller arrangement to mechanically roll over a spring based diaphragm arrangement placed on a fixed base, wherein the roller and rod arrangement is adjoined with magnets with different poles;
    at least one electronically driven load changer arrangement;
    at least one current and voltage sensor;
    at least one processing unit along comprising a serial peripheral interfacing (SPI) bus;
    an alarm generator and communicator; and
    a firmware analyzer.

2. The solar augmenter of claim 1, wherein a low power potential free contact is provided on the roller and rod arrangement for confirming the control circuit about the changeover events.

3. The solar augmenter of claim 1, wherein the at least one electronically driven load changer arrangement comprises a III-Nitride based electronic driven load changer arrangement.

\* \* \* \* \*